US011122467B2

(12) United States Patent
Singh et al.

(10) Patent No.: US 11,122,467 B2
(45) Date of Patent: Sep. 14, 2021

(54) SERVICE AWARE LOAD IMBALANCE DETECTION AND ROOT CAUSE IDENTIFICATION

(71) Applicant: VMWARE, INC., Palo Alto, CA (US)

(72) Inventors: Sarabjot Singh, Palo Alto, CA (US); Srikanth Hariharan, Sunnyvale, CA (US); Adnan Raja, Palo Alto, CA (US); Manu Sharma, Palo Alto, CA (US); Aditya Gudipati, Los Angeles, CA (US)

(73) Assignee: VMWARE, INC., Palo Alto, CA (US)

( * ) Notice: Subject to any disclaimer, the term of this patent is extended or adjusted under 35 U.S.C. 154(b) by 84 days.

(21) Appl. No.: 16/718,517

(22) Filed: Dec. 18, 2019

(65) Prior Publication Data
US 2020/0128441 A1 Apr. 23, 2020

Related U.S. Application Data

(60) Provisional application No. 62/781,306, filed on Dec. 18, 2018, provisional application No. 62/854,058, filed on May 29, 2019.

(51) Int. Cl.
H04W 28/08 (2009.01)
H04W 36/22 (2009.01)
H04W 36/04 (2009.01)
H04W 72/04 (2009.01)
H04L 12/26 (2006.01)
H04L 5/00 (2006.01)
H04L 12/24 (2006.01)
H04W 48/12 (2009.01)

(52) U.S. Cl.
CPC ........... H04W 28/08 (2013.01); H04L 5/0057 (2013.01); H04L 5/0094 (2013.01); H04L 41/22 (2013.01); H04L 43/0876 (2013.01); H04W 36/04 (2013.01); H04W 36/22 (2013.01); H04W 48/12 (2013.01); H04W 72/042 (2013.01); H04L 43/0888 (2013.01)

(58) Field of Classification Search
CPC . H04L 43/0876; H04L 43/0888; H04L 41/22; H04L 5/0057; H04L 5/0094; H04W 28/08; H04W 36/22; H04W 36/04; H04W 48/12; H04W 72/042
USPC ........................................................ 370/329
See application file for complete search history.

(56) References Cited

U.S. PATENT DOCUMENTS

| 7,729,262 B2* | 6/2010 | Crandall | H04W 72/02 370/238 |
| 2014/0133316 A1* | 5/2014 | Yoshida | H04L 43/04 370/250 |
| 2016/0192238 A1* | 6/2016 | Papadopoulos | H04W 28/08 370/235 |

* cited by examiner

Primary Examiner — Rownak Islam
(74) Attorney, Agent, or Firm — Clayton, McKay & Bailey, PC

(57) ABSTRACT

A system can include a network analysis platform that applies performance models to determine if a load imbalance exists at a cell, such as at a base station. The performance models are pre-trained based on network telemetry data. For a session at a cell, an expected load can be compared to an actual load to determine whether the session is impacted by a load imbalance. If the number of impacted sessions exceeds a threshold, the base station can be highlighted on a GUI. Additionally, the network analysis platform can perform root cause analysis of a victim cell based on session handoff analysis to determine how to decrease the imbalance impacts.

20 Claims, 13 Drawing Sheets

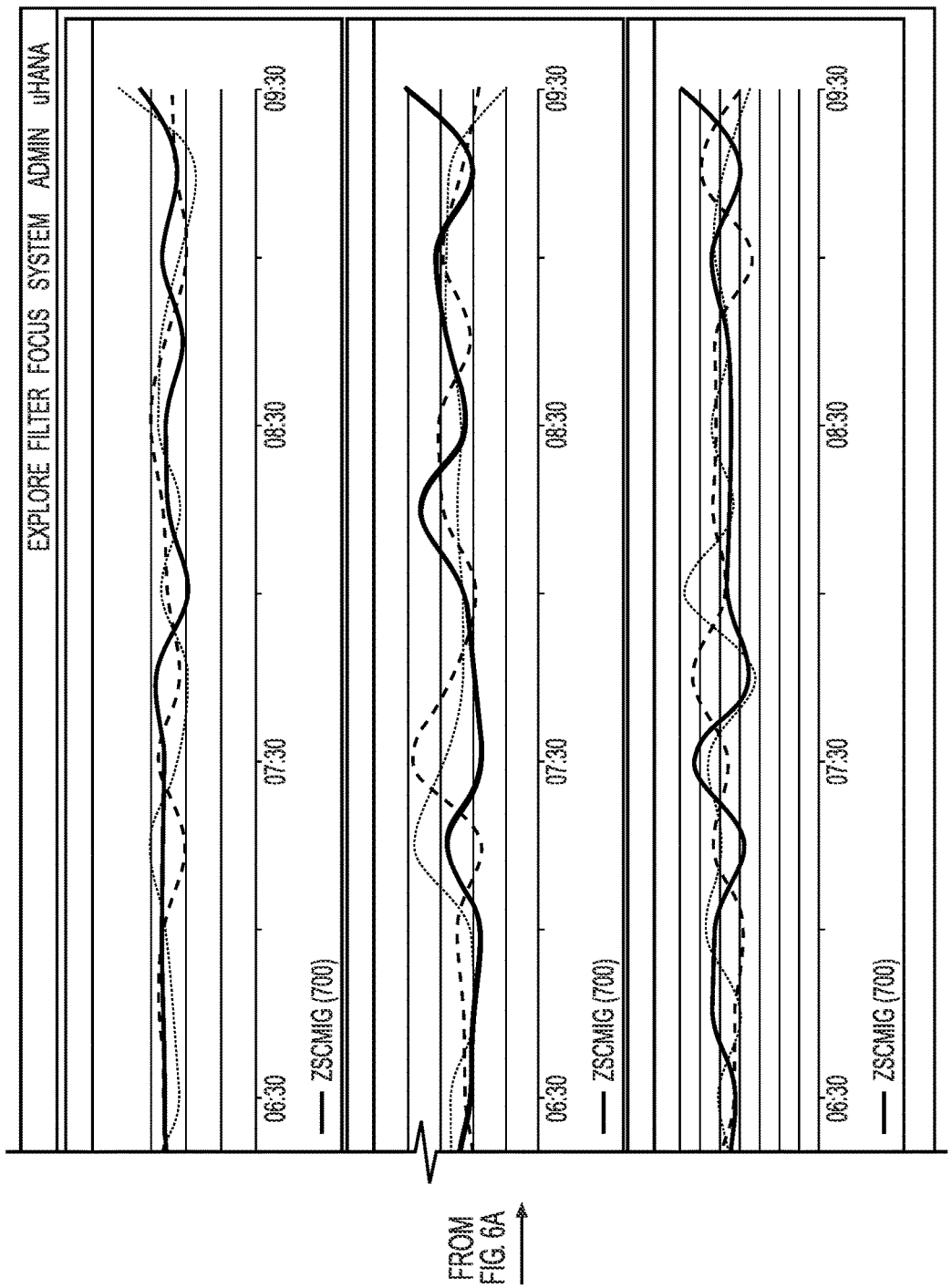

SERVICE AWARE LOAD IMBALANCE DETECTION AND ROOT CAUSE IDENTIFICATION

CROSS-REFERENCE TO RELATED APPLICATIONS

This non-provisional application claims priority to provisional application No. 62/781,306, titled "Service Aware LTE-RAN Load Imbalance Detection and Root Cause Identification Framework," filed Dec. 18, 2018, and also claims priority to provisional application No. 62/854,058, titled "Systems and Methods for Service Aware Uplink Quality Degradation Detection," filed May 29, 2019, both of which are incorporated by reference in their entireties.

BACKGROUND

Load balancing involves distributing network traffic across multiple servers or other devices. In the context of telco networks, the loads of a cellular network can be apportioned among a variety of base stations, also known as cells. Improper load balancing can cause high levels of network congestion at base stations, which in turn causes degradation of services such as downlink throughput, uplink throughput, voice quality, accessibility, and retainability. Imbalances can occur both in the control channel as well as the data channel. Control channel imbalance can result in users not getting scheduling grants in a timely manner and can also block admissions of new user sessions in the base station. Data channel imbalance can result in reduced user throughput on the downlink or uplink in the base station.

Current load balancing techniques are not always sufficient, especially in the telco environment. Cellular networks continue to gain heterogeneous infrastructure, with different base stations transmitting on varying carrier frequencies and at varying transmit powers, adding to the difficulty of balancing these different loads. Default methods of load balancing, such as directing traffic based on maximum signal strength (also referred to as "reference signal receive power" or "RSRP"), leads to significant load imbalance in the network. Specifically, base stations having a larger coverage footprint would face an overload, leading to suboptimal use of network capacity.

Furthermore, current systems for detecting load imbalances use heuristic triggers that do not necessarily address the core issues in an accurate way. For example, some balancing rules operate on network telemetry data, such as cell traffic reports, but ignore the service level impact caused to sessions in the network. These rules can therefore lead to false alarms and faulty detections. They also do not provide an ability to detect an underlying root cause of detected problems.

As a result, a need exists for detecting service degradation caused by load imbalance in the base stations of the sector and identifying the root cause responsible for that load imbalance.

SUMMARY

Examples described herein include systems and methods for load imbalance detection and root cause analysis ("RCA") in a telco network. A network analysis platform can detect load imbalance at a network cell, such as a base station, and display a related alert on a graphical user interface ("GUI"). The network analysis platform can use one or more performance models that are trained to determine a congestion state. The performance model can be trained based on historical data. A current load can be compared against an expected load based on normalized load parameters that can be used as inputs to the performance model.

In one example, the network analysis platform can receive telemetry data from network components. The telemetry data can include performance-related information for cells in the network, such as base stations. The telemetry data can be session-specific, related to cellular connections in the network. For example, the telemetry data can relate to signal quality, cell load, and interference level.

To detect a load imbalance, the network analysis platform can compare actual and expected throughput for a first base station among multiple base stations. The network analysis platform can determine an actual throughput for a first session at the first base station. This can include using telemetry data as inputs at the performance model. The network analysis platform can also predict an expected throughput for the first session. To make this prediction, the performance model can be supplied with inputs reflecting a normalized load at the first base station. In one example, the same performance model is used to determine actual throughput and predict the expected throughput. The normalized load can represent loads across the multiple base stations, in an example. In one example, the normalized load is determined based on at least one of: a utilization level of a downlink control channel across the plurality of base stations, an average number of users waiting in a queue of any of the plurality of base stations, a fraction of resources available on average to a user, an average utilization of a data channel of the base station; and a number of physical resource blocks available, on average, at the plurality of base stations.

Using the performance model, the network analysis platform can determine actual and expected throughput at base station for a session, in an example. The network analysis platform can determine a load imbalance based on the expected throughput exceeding the actual throughput by at least a threshold amount. The threshold amount can be preset and adjusted to change alert sensitivity in an example. The threshold can also just be any value lower than the expected throughput in an example. The difference between the expected and actual performance of a session at a cell can be measured as an impact. That impact can be compared against the threshold to determine if the session is impacted.

When a threshold number of impacted sessions at a cell is reached, such as three hundred sessions, the GUI can indicate a load imbalance exists at the cell. This can include presenting a visual map where a cell, such as a base station, is highlighted. In one example, a cell is highlighted when it is identified as having a threshold number of sessions impacted by the load imbalance.

The network analysis platform can also perform RCA on victim cells. When a cell is identified as impacted for a threshold number of sessions, the cell can be identified as a victim cell. The RCA on the victim cell can be based on handover statistics, in an example. Handovers, also called handoffs, can sometimes move user sessions from less loaded to heavily loaded cells based on mis-matched coverage footprints for the involved cells.

The RCA can include determining that a number outgoing of session handoffs from the base station exceeds a number of incoming session handoffs to the base station. In that case, the GUI can indicate that improved load balancing for the base station can be achieved by offloading additional traffic from the base station or reconfiguring load balancing parameters for the base station. The RCA can also include determining that a number of incoming session handoffs to the base station exceeds a number of outgoing session handoffs from the base station. As a result, the network analysis platform can group the incoming session handoffs as triggered by a vendor or based on a Long Term Evolution ("LTE") standard. Based on a majority of the incoming session handoffs being grouped as triggered by a vendor, the GUI can indicate that the vendor's load balancing parameters is a root cause. Alternatively, based on a majority of the incoming session handoffs being grouped as based on the LTE standard, the GUI can indicate that a coverage footprint of the base station is a root cause.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIGS. 6A and 6B are illustrations of an example GUI screen for load imbalance detection and root cause identification.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

The system can include a network analysis platform that applies performance models to determine if a load imbalance exists at a cell, such as at a base station. The performance models are trained based on network telemetry data that is collected by the network analysis platform. For a session at a cell, an expected load can be compared to an actual load to determine whether the session is impacted by a load imbalance. The expected load can be determined by applying normalized factors to the performance model, such as level of utilization, number of users in a queue during a scheduling interval, fraction of resources a user can utilize at the base station, utilization of the data channel across cells, and the number of physical resource blocks ("PRB") used in the downlink for the session. In one example, these factors can be scaled to represent to represent a 75th percentile case within the network based on the other cells (e.g., base stations) in the network. Some factors of the session can remain static to provide session-specific context, such as signal quality and interference level. The actual load can also be measured using the same performance model, in an example. If the expected and actual load values diverge beyond a threshold amount, this can indicate that the session is impacted by a load balance.

A GUI can display the cells and number of corresponding impacted sessions. When the number or impacted sessions exceeds a threshold, RCA can also be performed so that an administrator or automated process can take corrective action. For example, by analyzing incoming and outgoing handoffs at a victim cell, the GUI can display a root cause of vendor load balancing parameters is a root cause or a coverage footprint of the base station is a root cause.

Figure 1:
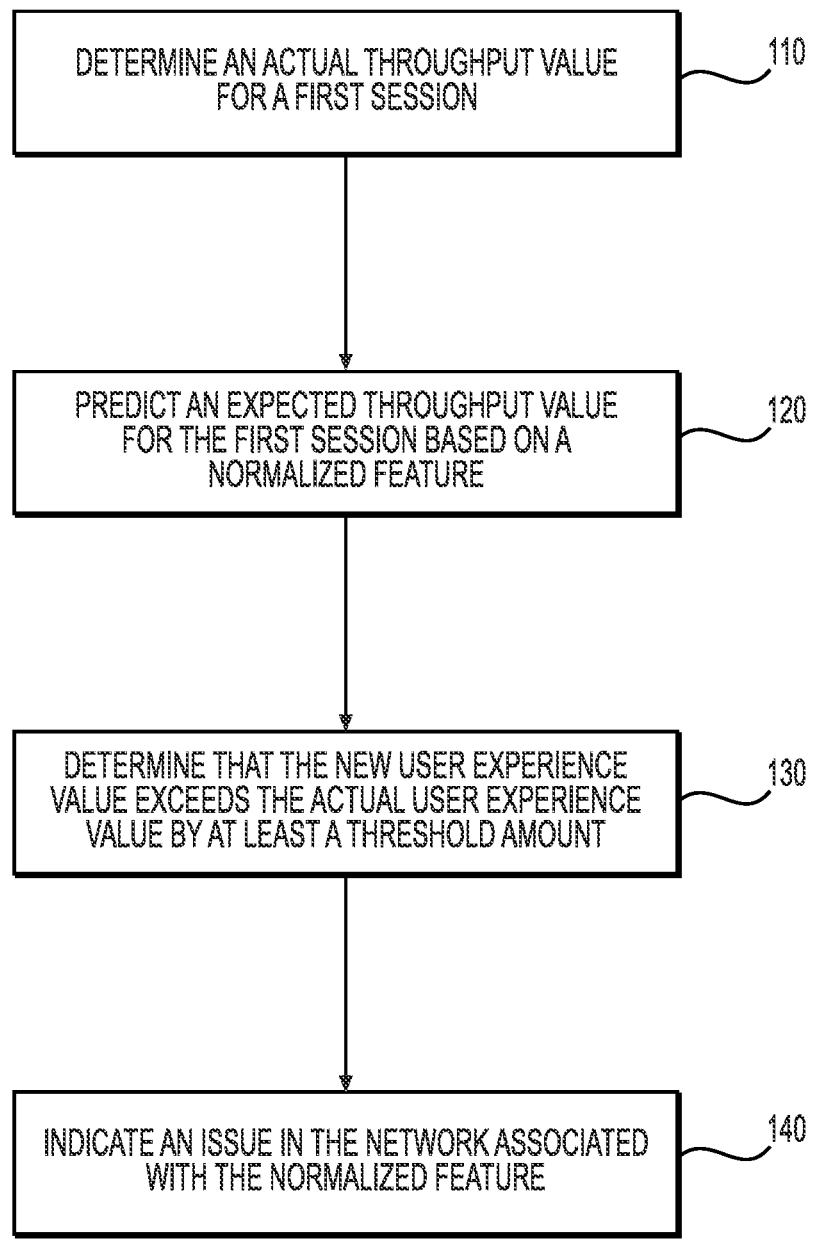
FIG. 1 is a flowchart of an example method for load imbalance detection and root cause identification.

FIG. 1 is a flowchart of an example method for load imbalance detection and root cause identification. At stage 110, the network analysis platform can determine an actual throughput value for a first session. The throughput can be measured for the session at the base station. Telemetry data can be used to determine the throughput. For example, cells in the network can send telemetry data to the network analysis platform. Example cells can include base stations, cell towers, or any node within the network. In one example, the network analysis platform can determine actual throughput by applying a performance model to the telemetry data. The performance model can be pre-trained to output throughput based on other factors. The factors can include signal quality, cell load, and interference level. The training can include applying machine learning algorithms to a large set of telemetry data to tune a performance model for predicting throughput.

The telemetry data can include key performance indicators ("KPIs"), such as round-trip time for data packets, latency, and other indicators that can be used to determine throughput. The telemetry data can also include user network session throughput information for at least one user network session and user network session radio access network ("RAN") information for at least one user network session. This information will also be described in more detail with respect to FIG. 3B.

Continuing with FIG. 1, at stage 120 the network analysis platform can predict an expected throughput for the first session based on a normalized feature. One or more normalized features can be used as inputs, along with features that are not normalized and instead represent the current state the session or cell. Using these inputs, the performance model can output an estimated throughput value in an example. The normalized inputs can be selected to estimate what the cell's throughput would be (for the session) at a healthy cell, such as a cell performing at a 75% level compared to the other cells in the network.

Table 1 includes example normalized features that can be used with the performance model to estimate a congestion state of the cell.

TABLE 1

Example normalized features use with performance model.

| Normalized Feature | Description |
| --- | --- |
| $CCE\_UTILIZATION_{new}$ | mean of utilization across cells at which load is to balanced. |
| $UE\_PER\_ACTIVE\_TTI_{new}$ | Sum($UE\_PER\_ACTIVE\_TTI_{orig}$) of candidate cells multiplied by a scaling factor. |
| $DERIV\_SEGG\_C_{new}$ | ($UE\_PER\_ACTIVE\_TTI_{new}$ − $UE\_PER\_ACTIVE\_TTI_{orig}$)/ $UE\_PER\_ACTIVE\_TTI_{orig}$ |
| $PRB\_UTIL\_DL_{new}$ | mean of $PRB\_UTIL\_DL_{orig}$ across candidate cells |
| $USED\_INIT\_DL_{new}$ | $PRB\_UTIL\_DL_{new}$ X 1 minute X resource blocks available at the serving cell |

The normalized features of Table 1 include the subscript "new," which designates the new normalized values determined across multiple cells (some or all) in the network. $CCE\_UTILIZATION_{new}$ can represent a level of utilization in a control channel of a downlink. It can be calculated based on the mean utilization across the cells at which the load is to be balanced. The utilization of a cell can be retrieved as the DERIV_PDCCH_CCE_UTILIZATION telemetry datatype in one example.

A second normalized factor can be $UE\_PER\_ACTIVE\_TTI_{new}$. This factor can represent the number of users (UE standing for user experience) that are updating in the base station queue at a given transmission time interval ("TTI"). This value can be normalized by summing the active UE's over the cells to be balanced, multiplied by a scaling factor. The scaling factor can be based on the available control channel resources. For example, the scaling factor can be PER_CELL_CCE_AVAIL, which can be a telemetry datatype that captures bandwidth of a cell. This telemetry value of the serving cell can be divided by the sum of the same telemetry value of candidate cells to provide the scaling factor for the normalization resulting in $UE\_PER\_ACTIVE\_TTI_{new}$.

$DERIV\_SEGG\_C_{new}$ can be another normalized factor representative of a fraction of resources the user can get from the cell while it is being served. The normalized value can be obtained by the normalized active UE per TTI minus the original value, that total divided by the original value. This amount can serve as a multiplier against the original DERIV_SEGG_C value (representing actual fraction of resources the user gets from the cell) in an example.

Another possible normalized factor for use at the performance model is $PRB\_UTIL\_DL_{new}$. This can represent the utilization of the data channel on the serving base station. The normalized value can be derived as the mean of this utilization across the candidate cells. The number of PRB used can be normalized and represented as $USED\_INIT\_DL_{new}$. This can be the raw number of PRB utilized by the downlink of the cell, multiplied by a time period (e.g., one minute) and multiplied by available resource blocks at the serving cell. The resource blocks can be proportional in a one-to-one mapping to the bandwidth at the serving cell. For example, 10 MHz bandwidth may correlate to 10 PRBs, 20 MHz can correlate to 20 PRBs, and so on.

In one example, the normalized features represent performance at the $75^{th}$ percentile of the cells in the network. Therefore, the throughput output from the performance model is an estimate for throughput if the cell were operating as well as the upper quarter of the cells in the network in terms of load.

These normalized features, combined with non-normalized features, can be used as inputs at the performance model to determine an expected congestion state (e.g., with an output representing expected throughput). Non-normalized features that represent the state of the cell can include signal quality, cell load, and interference level, in an example.

Stage 130 can include determining that expected throughput exceeds the actual throughput value by at least a threshold amount. In one example, the difference between the expected and actual throughput represents the impact of load imbalance on a session at the cell. If that impact is large enough, then the network analysis platform can count the impact against the cell. For example, a threshold that would represent a 50% increase from the expected load can be used in an example. In more detail, if the normalized features are used to output a throughput (T2) representative of an expected throughput for a top 25% cell (based on load), then the actual throughput (T1) can be compared against T2 to determine how impacted the cell is. If the difference between T2 and T1 is beyond a threshold, then the session is impacted by a load imbalance. T2 can represent the potential improvement available at the cell if the load for the session was balanced similarly to a $75^{th}$ percentile cell.

At stage 140, the GUI can indicate that the first base station has a load imbalance issue. In one example, the GUI represents cells in the network, including the first base station. These cells can be represented on a map relative to their geographic locations. The first base station can be highlighted on the map when a threshold number of session impacts are detected for the first base station. For example, the network analysis platform can count each session that is impacted in stage 130 and display the number of impacted sessions, in an example. If the number of impacted sessions exceeds a threshold, then that number or an icon on the GUI can be highlighted to draw the administrator's attention.

A cell with a load imbalance issue can be referred to as a "victim cell." For a victim cell, the GUI can also display additional information about the root cause of the load imbalance. To determine the root cause for the victim cell, the handoffs for that cell can be analyzed, as later described in more detail in FIG. 2B.

In one example, the GUI can provide options for the user to drill down on victim cells to investigate root cause. For example, the user can select the victim cell, causing the GUI to display various alerts associated with that cell.

Figure 2A:
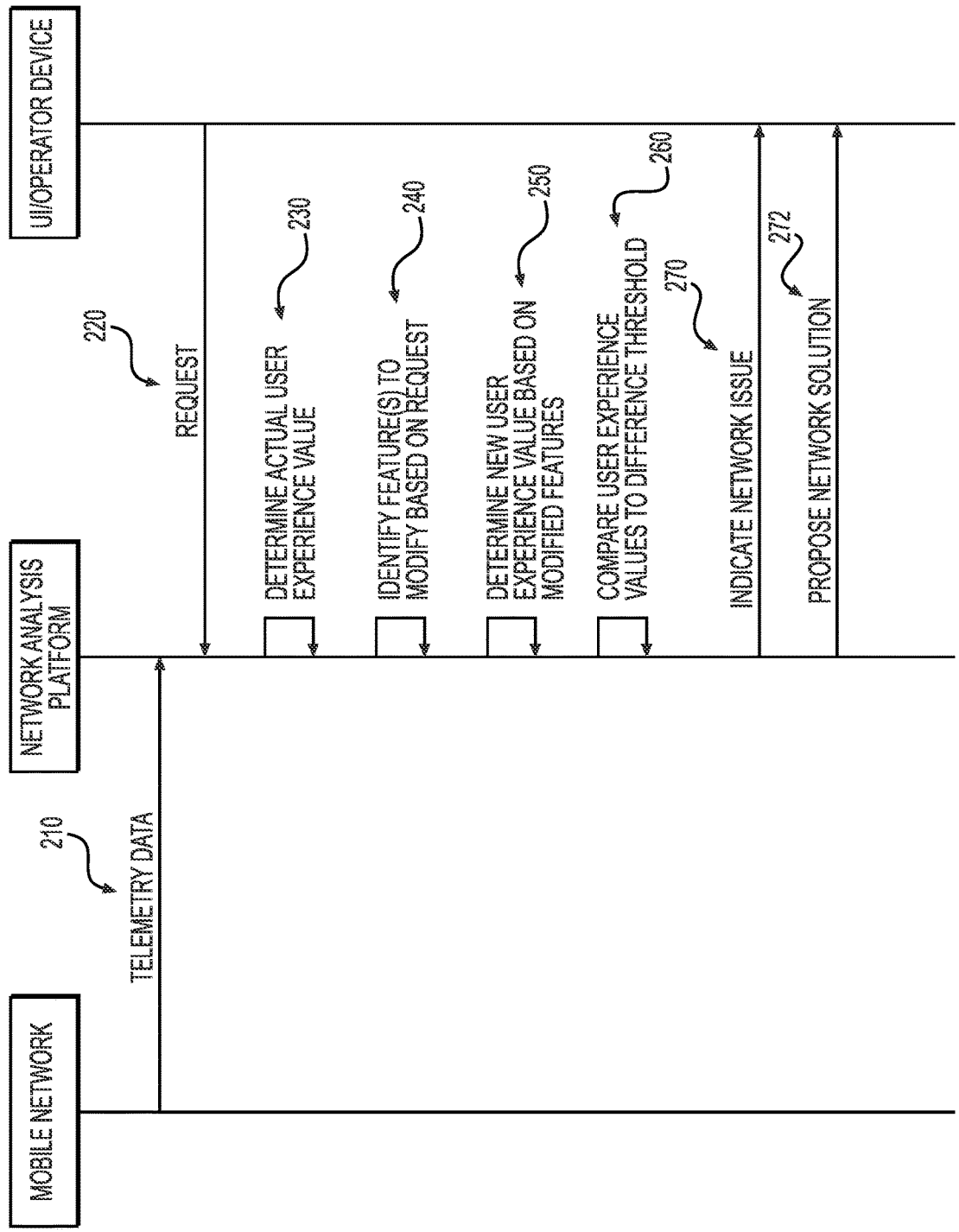
FIG. 2A is a sequence diagram of an example method for load imbalance detection and root cause identification.

FIG. 2A is a sequence diagram of an example method for load imbalance detection and root cause identification. At stage 210, telemetry data can be received at the network analysis platform from various cells within the mobile network. Stage 210 can be ongoing in an example, with telemetry data being received at periodic intervals or constantly queued from reporting cells. The telemetry data can be captured and measured in real time by base stations, which send the telemetry data to the network analysis platform.

At an operator device, an administrator can use a GUI to request cell performance information at stage 220 that relates to user experience on the network. This can include requesting information about load balance on the network, such as by providing a selection option to check for load balance within the network. In another example, the request is a query that can identify either a user, a set of users, or a time range. The user can correspond to a particular session ID. The time frame query can instead look for problems for all or multiple sessions within the time frame.

In another example, stage 220 is an automated request. The GUI or operator device can request updated analytics for the cells in the network. This can include requesting load information at stage 220. Other requests can be made for other metrics or potential problem sources that can also be displayed on the GUI in addition to load imbalances.

At stage 230, the network analysis platform can receive the request from the GUI and determine which performance model and normalized features to use in detecting impacted network cells. These can be specified as part of the request in one example. For example, the request can indicate load balance detection, a performance model for use, and a normalization level. The normalization level can indicate the level of performance to estimate, such as a value of 75% indicating that the estimation should be for a cell performing at a 75% level compared to the other cells in the network. The request can also indicate an acceptable threshold difference between actual and expected performance, in an example.

Based on the request, at stage 240 the network analysis platform can determine which factors to normalize. The request can also influence how much to normalize those factors. For example, a request related to detecting load imbalances can be recognized as requiring normalization of the factors used by the performance model for estimating throughput. Those factors can be normalized to a default amount, such as the 75% level previously mentioned. Otherwise, they can be normalized according to a custom percentile included with the request. The values of the normalized factors can be determined ahead of time.

At stage 250, the normalized values are determined for the features. This can be based on formulas such as those described for Table 1, above. The normalized values for some features can be calculated based on average values from other cells that can be part of load balancing. The averages can be precalculated in an example.

At stage 260, an impact amount is determined by comparing the expected throughput to the actual throughput. This can include comparing the output of the performance model based on normalized features to the output of the performance model using current features. The difference between the two outputs, when exceeding a threshold, can indicate a network issue, such as load imbalance or congestion.

At stage 270, the network analysis platform can send the indication to the GUI. The network analysis platform can also propose a network solution at stage 272. In one example, an RCA analysis is performed when a threshold number of issues is reached. For example, if a threshold number of imbalance impacts are detected at the session, then an RCA can be performed at the cell (called a victim cell). The root cause can then be displayed on the GUI, with suggested steps to address the root cause. To determine the root cause of the impacted sessions due to cell imbalance, handovers at the cell can be analyzed.

Figure 2B:
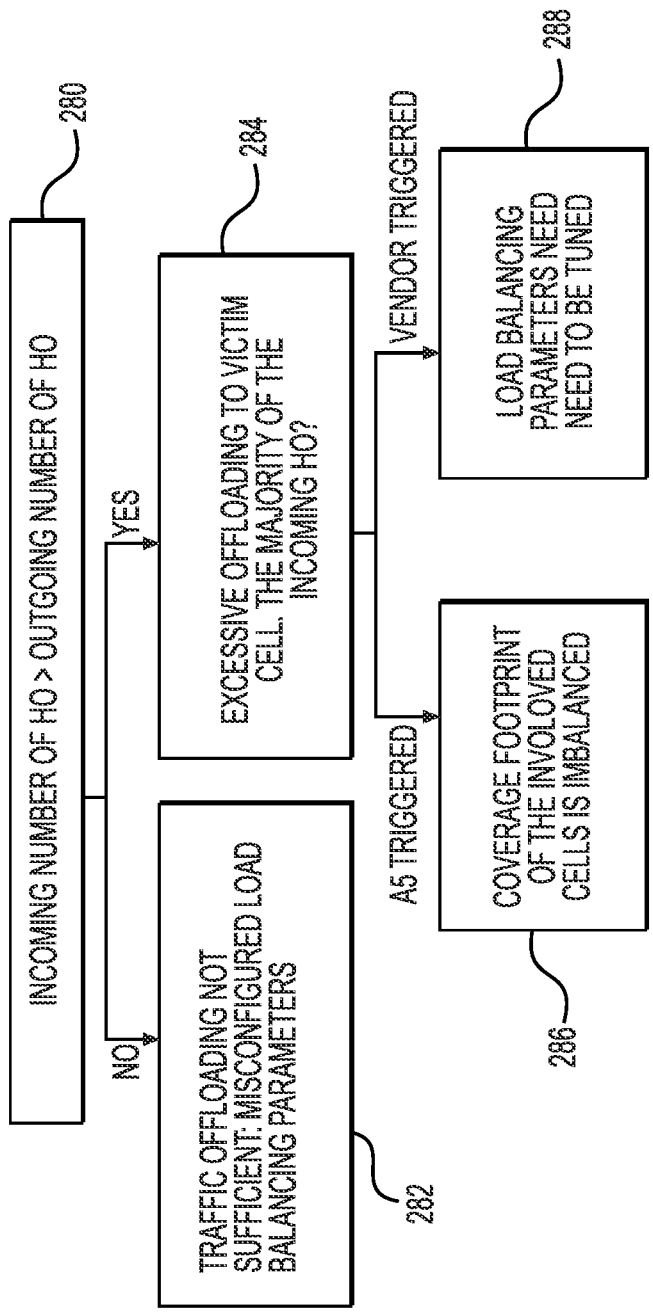
FIG. 2B is a flowchart of an example method for load imbalance detection and root cause identification.

FIG. 2B is a flowchart of an example method for root cause identification based on handover ("HO") analysis. The root cause of load imbalance across network cells can be determined using handover statistics across the cells. For example, handovers moving user sessions from less loaded to heavily loaded cells may be triggered by LTE A5 trigger measurement reports that indicate a mismatched coverage footprint of the involved cells. Alternatively, handovers moving user sessions from less loaded to heavily loaded cells can be triggered by a cell vendor's own load balancing unit being misconfigured. The stages of FIG. 2B can determine these root causes in an example.

At stage 280, the network analysis platform can determine whether the incoming number of session handoffs at a victim cell is greater than the outgoing number of session handoffs from the victim cell. The cells, such base stations, can track both incoming and outgoing handoffs over a period of time.

If the incoming handoffs are higher, then at stage 284 the network analysis platform can determine there is excessive offloading to the victim cell. Then, the network analysis platform can check whether the majority of the incoming handovers at the victim cell are coming from an LTE A5 trigger or a vendor trigger. If A5 triggered, then at stage 286 the network analysis platform can determine that the root cause is a coverage footprint mismatch. If vendor triggered, then at stage 288 the network analysis platform can determine that the load balancing parameters need to be tuned.

Similarly, if at stage 280 the outgoing handoffs to the victim cell are greater, then at stage 282 the network analysis platform can determine that the root cause is misconfigured load balancing parameters. This misconfiguration can be causing insufficient traffic offloading. This root cause can let the administrator or automated process know to change the load balancing parameters to increase the performance and alleviate imbalance at the victim cell. The root cause can be displayed on the GUI.

In one example, the information is exposed based on the GUI sending a query to the network analysis platform. The query can specify a user ID for the user session for which the imbalance impact is to be determined. The query can also include a time range (with or without a user ID) that specifies a range of time over which the load imbalance problems are to be retrieved. The response can be a root cause list for the user or time range requested. The response can also identify the corresponding impact. This can indicate a number of users impacted (if queried by time rage) and the fractional degradation in quality of service ("QoS") (if queried by user ID), in an example.

Figure 3A:
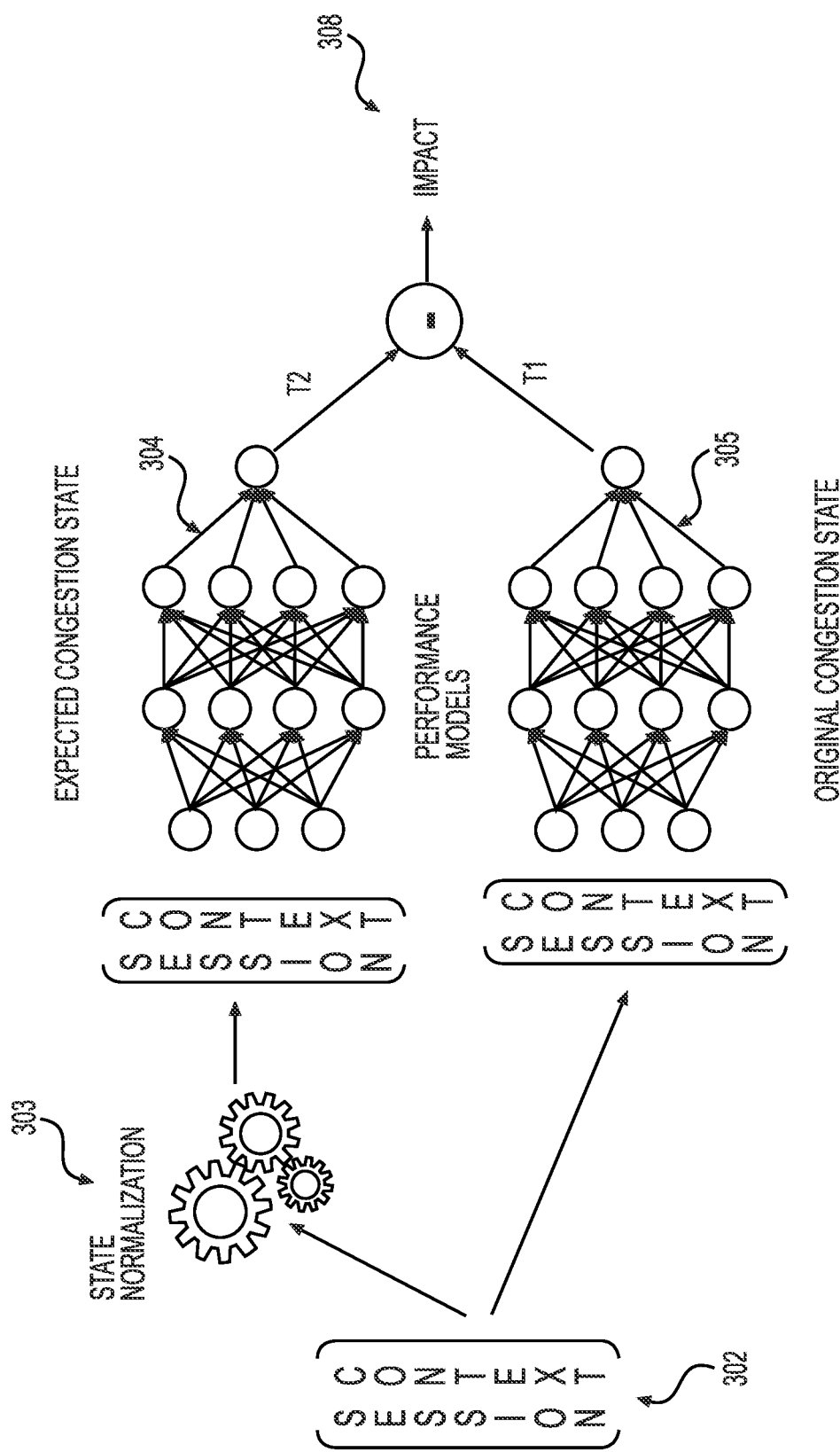
FIG. 3A is a flowchart of an example method for using performance models to determine load imbalance impact.

FIG. 3A is a flowchart of an example method for using performance models to determine load imbalance impact. The performance models 304, 305 can be used to determine an expected congested state and a current (original) congested state for a cell relative to a session, in an example. The process can start using session context 302, which can include various parameters regarding the session, such as signal quality, cell load, and interference level. At stage 303, normalization can occur so that certain feature values are set to an ideal level, such as $75^{th}$ percentile performance among the cells over which load balancing can take place. These normalized feature values can be used as inputs, along with the session context, in the performance model 304. The performance model 304 can output an expected throughput value T2. This value (T2) can be compared against an actual throughput at the cell during the session. The actual throughput can likewise be estimated by the performance model 305, which can be the same as performance model 304 in an example. The output of actual throughput can be T1. Alternatively, actual throughput T1 can be calculated in real time based on telemetry and without the need to estimate using the performance model 305.

The difference between T2 and T1 can indicate an impact 308, in an example. In one example, the difference between T2 and T1 must exceed a threshold before an impact 308 is indicated. The network analysis platform can track the number of impacts at a cell for purposes of identifying victim cells and displaying impact numbers on the GUI.

Figure 3B:
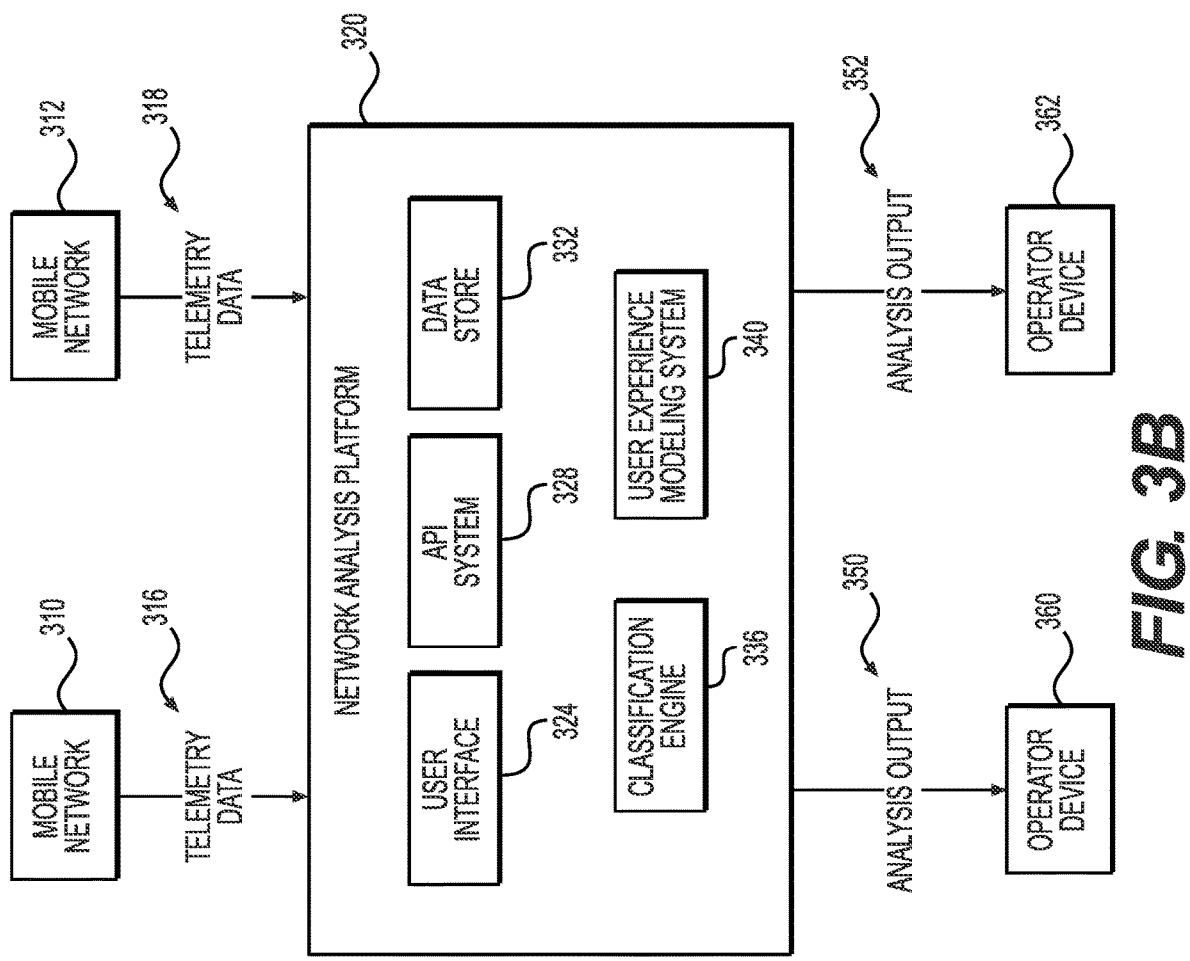
FIG. 3B is an illustration of example system components for load imbalance detection and root cause identification.

FIG. 3B shows an illustration of an example system that includes a network analysis platform 320 and a network 310. The network 310 can be a wireless network that provides network communication for mobile devices. For example, the network 310 can be at least one of a mobile network, cellular network, wireless network, wireless spectrum network, or any other network maintained by a network operator. In some examples, the network operator is a streaming media provider, internet service provider, vendor, or other entity associated with a network.

The mobile network 310 can send telemetry data 316 to the network analysis platform 320. The network analysis platform 320 can also receive information from a separate, second mobile network 312 that provides its own telemetry data 318. The telemetry data 316, 318 can provide a time-frequency characteristic and a spatial characteristic. In some examples, telemetry data 316, 318 includes at least one of: a timestamp of when an event occurred in the network 310, 312; a threshold relating to data bandwidth, download speed, call failure, or other aspect of the network has been exceeded, and at what time; the frequency of calls being dropped for VoiceIP data; the location of cell towers within the mobile network; customer complaints received, in which areas, and at what frequency; and any other data relating to the network 310, 312 and telemetry 316, 318. The platform 320 can monitor the network 310, 312 and collect the associated telemetry data 316, 318. In some embodiments, the telemetry data 316, 318 is stored within a datastore 332 within the platform 320 or available to the platform 320.

The telemetry data 316, 318 can also include at least one of user network session throughput information for at least one user network session, and user network session radio access network (RAN) information for at least one user network session. In some examples, RAN information includes information describing radio communication between a transceiver of an edge node of the network 310, 312 and a modem of a UE of the user network session. In some embodiments, RAN information for a user network session ("user session" or "session") includes at least one of: downlink coverage (RSRP, RSRQ) of the user session; downlink quality (SINR, CQI) experienced by the user session; uplink coverage (path loss, uplink power restriction) of the user session; uplink quality (PUSCH, PUCCH SINR) experienced by the user session; downlink modulation and coding for the user session; uplink modulation and coding for the user session; downlink PRB resources allocated for the user session; downlink PRB usage of cell; uplink PRB resources allocated for the user session; uplink PRB usage of cell; control channel utilization in cell; number of active users in cell on uplink and downlink; number of active users in cell perceived by user session; QCI of the user session; downlink NACK rate of the user session; downlink DTX rate of the user session; uplink NACK rate of the user session; uplink DTX rate of the user session; available bandwidth and control channel elements on uplink and downlink; and Power Headroom Reports (PHR) of the user session.

In some examples, the network 310, 312 includes at least one infrastructure element, such as, for example, a base station, a cell tower, and other elements of a mobile network infrastructure. The network 310, 312 can be a Long-Term Evolution ("LTE") network or a 5G network, for example. In some embodiments, the network 310, 312 includes at least one edge node. The edge node can include at least one of a radio transceiver, a power amplifier, and an antenna. In some examples, the edge node is constructed to exchange information with at least one user device (e.g., a mobile phone or IoT device that includes a wireless network interface device) using the radio transceiver of the edge node and a radio transceiver included in a wireless modem of the user device.

In some examples, the edge node of the network 310, 312 is a base station node. For example, the edge node can be an Evolved Node B ("eNodeB"). The edge station node can be communicatively coupled to at least one of a Radio Network Controller ("RNC"), a Mobility Management Entity ("MME") node, a gateway node (such as a serving gateway or packet data network gateway), and a home subscriber server ("HSS").

In some examples, prior to exchanging information with a user device, the edge node establishes a wireless communication session with the user device by performing a signaling process, the result of the signaling processing being an established communication session between the user device and the edge node of the network 310, 312. In some examples, each session between a user device and an edge node of the network is managed by an MME of the network 310, 312.

The network analysis platform 320 can be implemented by a mobile networking service, network monitoring and/or control service, network security service, internet service provider, or any other network service. In some examples, one or more aspects of the system can be enabled by a web-based software platform operable on a web server or distributed computing system. In some examples, the platform 320 can be implemented as at least one hardware device that includes a bus that interfaces with processors, a main memory, a processor-readable storage medium, and a network interface device. The bus can also interface with at least one of a display device and a user input device.

In some examples, at least one network interface device of the platform 320 is communicatively coupled to at least one network interface device of the network 310, 312 (e.g., an MME) directly or indirectly via one of a public network (e.g., the Internet) or a private network. In some examples, at least one network interface device of the platform 320 is communicatively coupled to a network interface device of at least one operator device 360, 362.

The platform 320 can include an API system 328 that provides an API that is used by a device (e.g., operator device 360, 362, a network monitoring system of the network 310, 312, a node of the network 310, 312) to communicate with the platform 320. In some examples, the API system 328 provides a REST API. The API system 328 can include a web server that provides a web-based API. The API system 328 can be configured to process requests received from a node of the mobile network 310, 312 (e.g., a network monitoring system) to receive telemetry data from the network 310, 312. In some embodiments, the API system 328 includes a web server that provides a web-based API.

In some examples, the platform 320 includes a user interface system 324. The user interface system 324 can be an application server (e.g., web server) that is configured to provide a user interface through which an operator device 360, 362 can interact with the platform 320. The platform 320 can process requests received from an operator device 360, 362 (e.g., through the API system 328 of the platform 320 or the user interface system 324 of the platform 320) relating to telemetry data 316, 318 from the network 310, 312. For example, the operator device 360, 362 can provide the platform 320 with connection information for establishing a network connection with a node of the mobile network 310, 312, and the platform 320 can use that connection information to establish a network connection with the node of the mobile network 310, 312 and receive telemetry data 316, 318 from the network 310 via the established network connection.

As mentioned above, the platform 320 can include a data store 322. The data store 322 can be a database (e.g., a relational database, a NoSQL database, a data lake, a graph database). The data store 322 includes telemetry data of the network 310. The platform 320 can access telemetry data 316, 318 from the network 310, 312 and store the accessed telemetry data 316, 318 in the data store 332. The data store 332 can include one or more databases in which telemetry data 316, 318 collected from operators of mobile networks or other various entities is stored. In one example, the data store 332 includes a mobile network databank for storing mobile network data during an analysis of problems within the network.

The platform 320 can also include a user experience modeling system 340. In some examples, the modeling system 340 generates a trained user experience model that outputs a prediction of a user experience value given an input data set that includes data for one or more features included in RAN information of the network 310, 312. The data can include, for example, RAN information stored in the data store 332 and RAN information received as telemetry data 316, 318 from the network 310, 312. In some examples, each input data set input into the trained user experience model represents a user network session. For each input data set being used to train a user-experience model, the platform 320 can access information indicating at least one of uplink throughput, downlink throughput, voice quality, call drops, and setup failures. In some examples, for each input data set being used to train a user-experience model, the platform 320 stores information indicating at least one of uplink throughput, downlink throughput, voice quality, call drops, and setup failures.

In some examples, the modeling system 340 generates the trained user experience model to predict at least one of uplink throughput, downlink throughput, voice quality, call drops, and setup failures as a target of the model. The modeling system 340 can generate the trained user experience model based on user input received from the operator device 360, 362. The user input can identify at least one of a target for the model and a feature of RAN information to be used by the model. The platform 320 can store at least one trained user-experience model, such as by storing it within the data store 332. The platform 320 can also receive or access a trained user-experience model provided by an operator device 360, 362.

The platform 320 can be a multi-tenant platform that manages platform accounts for a plurality of networks 310, 312. For example, a first platform account can be associated with a first operator device 360 and first network 310, while a second platform account can be associated with a second operator device 362 and a second mobile network 312. In some examples, the platform 320 stores a first user-experience model for the first platform account and a second user-experience model for the second platform account. The first user-experience model can be trained on RAN information received from the first network 310, while the second user-experience model can be trained on RAN information received from the second network 312. Alternatively, the user-experience models can be trained based on combined information from both the first and second networks 310, 312. In some examples, the first user-experience model has a target selected by the first operator device 360, while the second user-experience model has a target selected by the second operator device 362.

The user experience modeling system 340 can include one or more of a local machine learning system (e.g., implemented in Python, R, or another language), a cloud-based machine learning client (e.g., an application communicatively coupled to a cloud-based machine learning system such as, for example, MICROSOFT AZURE MACHINE LEARNING SERVICE). At least one machine learning system included in the system 340 can be configured to perform one or more of: supervised learning (e.g., using logistic regression, back propagation neural networks, random forests, or decision trees), unsupervised learning (e.g., using an apriori algorithm or kmeans clustering), semi-supervised learning, reinforcement learning (e.g., using a Q-learning algorithm or temporal difference learning), and any other suitable learning style.

In some examples, at least one model generated by the system 340 implements at least one of: a regression algorithm (e.g., ordinary least squares, logistic regression, stepwise regression, multivariate adaptive regression splines, or locally estimated scatterplot smoothing), an instance-based method (e.g., k-nearest neighbor, learning vector quantization, or self-organizing map), a regularization method (e.g., ridge regression, least absolute shrinkage and selection operator, or elastic net), a decision tree learning method (e.g., classification and regression tree, iterative dichotomiser 3, C4.5, chi-squared automatic interaction detection, decision stump, random forest, multivariate adaptive regression splines, or gradient boosting machines), a Bayesian method (e.g., naïve Bayes, averaged one-dependence estimators, or Bayesian belief network), a kernel method (e.g., a support vector machine, a radial basis function, or a linear discriminant analysis), a clustering method (e.g., k-means clustering or expectation maximization), an associated rule learning algorithm (e.g., an apriori algorithm or an Eclat algorithm), an artificial neural network model (e.g., a Perceptron method, a back-propagation method, a Hopfield network method, a self-organizing map method, or a learning vector quantization method), a deep learning algorithm (e.g., a restricted Boltzmann machine, a deep belief network method, a convolutional network method, or a stacked auto-encoder method), a dimensionality reduction method (e.g., principal component analysis, partial least squares regression, Sammon mapping, multidimensional scaling, or projection pursuit), an ensemble method (e.g., boosting, bootstrapped aggregation, AdaBoost, stacked generalization, gradient boosting machine method, or random forest method), and any other suitable form of machine learning algorithm. In some examples, at least one processing portion of the system 340 can additionally or alternatively leverage: a probabilistic module, heuristic module, deterministic module, or any other suitable module leveraging any other suitable computation method, machine learning method or combination thereof. Any suitable machine learning approach can otherwise be incorporated in the system 340.

Figure 4A:
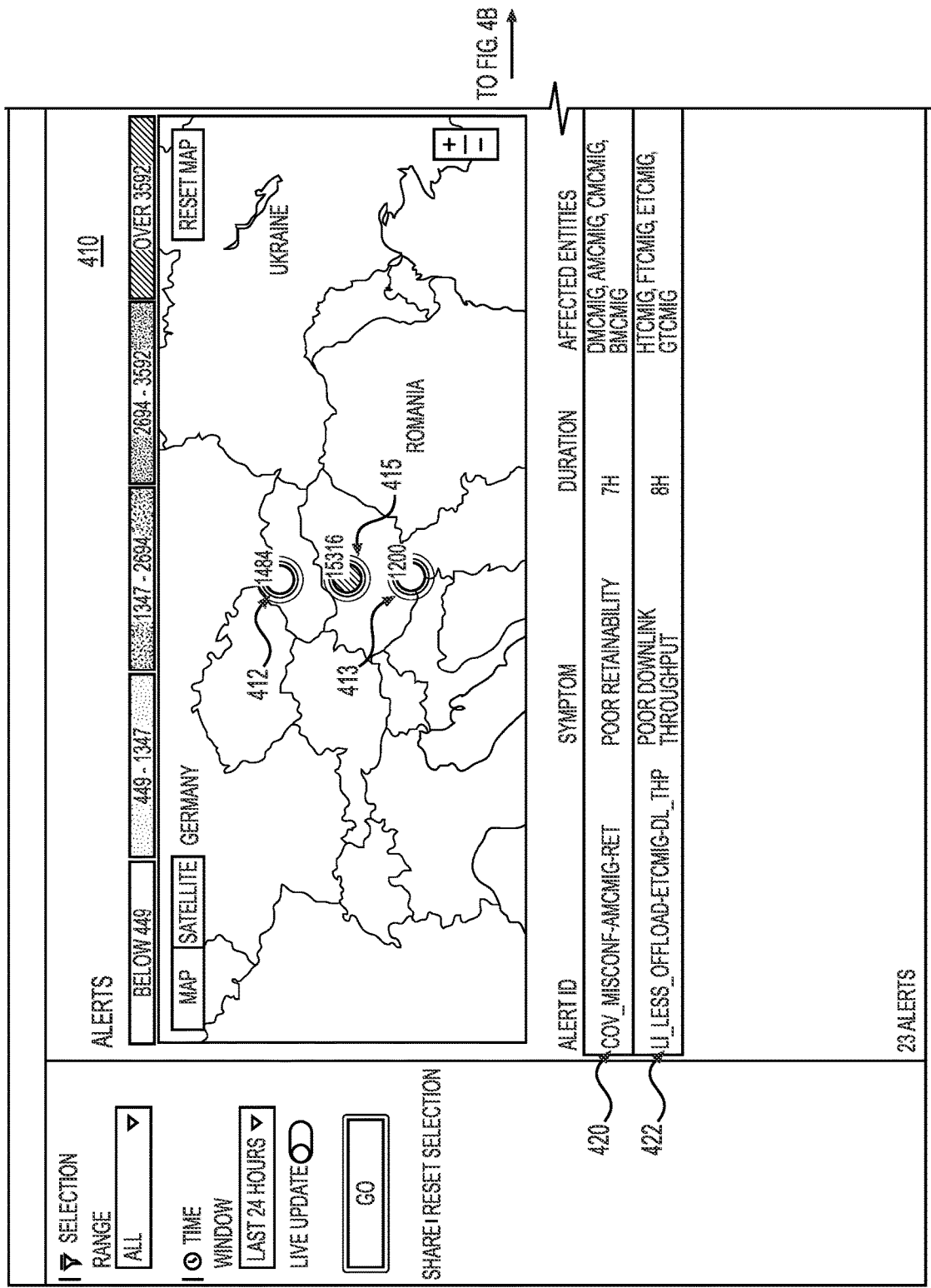
FIGS. 4A and 4B are illustrations of an example GUI screen for load imbalance detection and root cause identification.
Figure 4B:
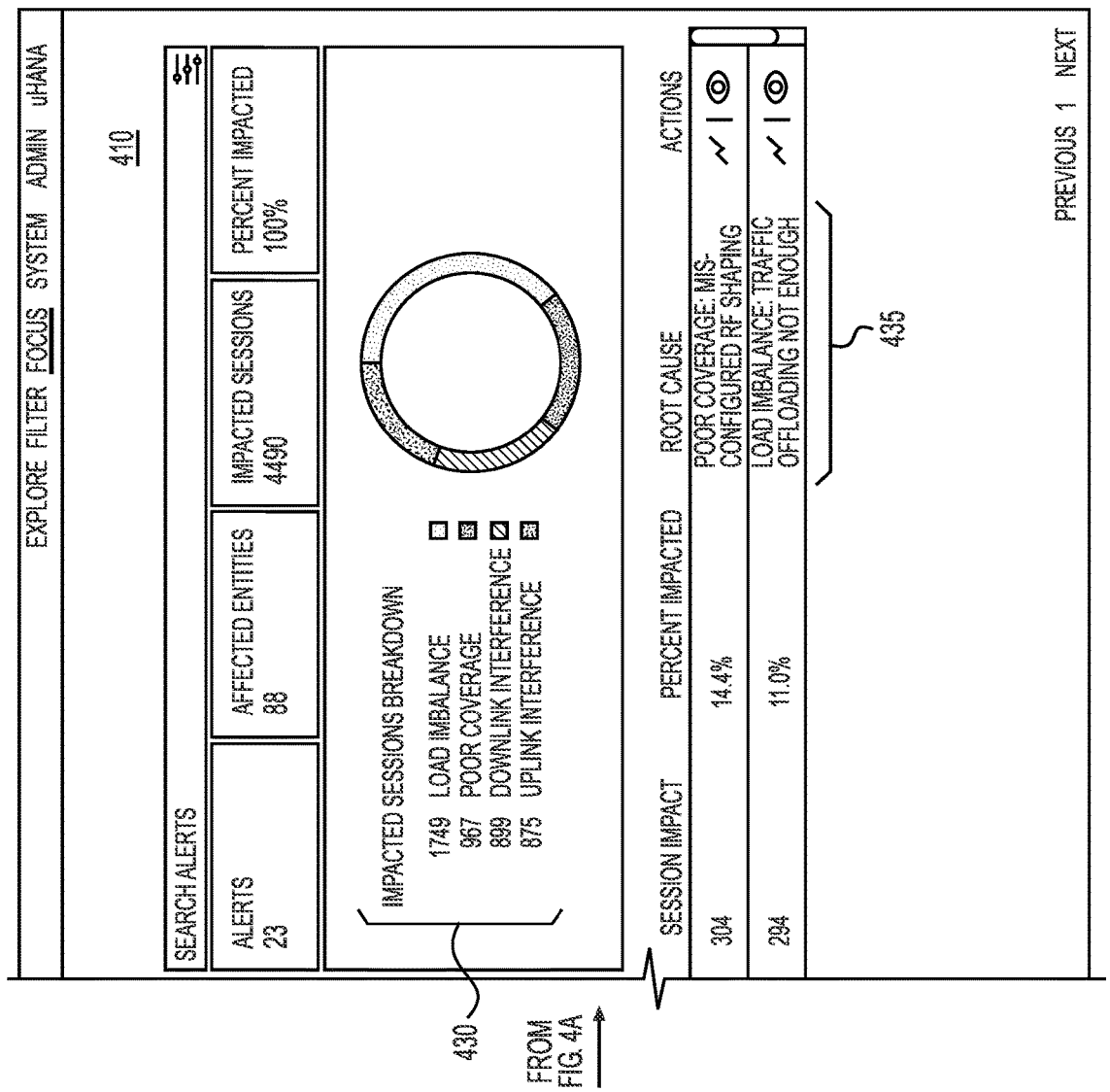

FIGS. 4A and 4B are illustrations of an example GUI screen 410 for load imbalance detection and root cause identification. The screen 410 spans both FIGS. 4A and 4B. Beginning with FIG. 4A, a map area on the screen 410 can show geographic locations of base stations 412, 413, 415. Additionally, numbers of imbalance impacts for each base station 412, 413, 415 can be displayed on the GUI. In this example, base station 412 has 1484 impacts, base station 413 has 1200 impacts, and base station 415 has 15316 impacts. These impacts can be limited to a particular type, such as load imbalance, or can include impacts for multiple different performance features, such as poor coverage, uplink issues, and downlink issues. A threshold impact number can be 5000. Because base station 415 exceeds that threshold (having 15316 impacts), it can be highlighted differently on the GUI. This highlighting can indicate that the base station 415 is a victim cell.

Alerts 420, 422 can be displayed on the GUI relative to one or more selected or displayed cells. In this example, the first alert 420 relates to poor retainability, which can be recognized using a different performance model than for load imbalance, along with different normalized features. The impacted cells can be identified along with the duration (7 hours) of the alert.

A second alert 422 can indicate a load imbalance based on poor downlink throughput. More information can be provided on screen 410 as shown in FIG. 4B. In one example, a root cause 435 is shown for the alerts. For the second alert 422, the root cause can be not enough traffic offloading. The administrator can investigate further to determine if that is based on misconfigured load balancing parameters.

Additionally, screen 410 can give a breakdown 430 of the impacted sessions at the victim cell. In this example, the sessions are impacted based on load imbalance, poor coverage, downlink interference, and uplink interference. These can each be determined using different performance models and different normalized factors.

Figure 5A:
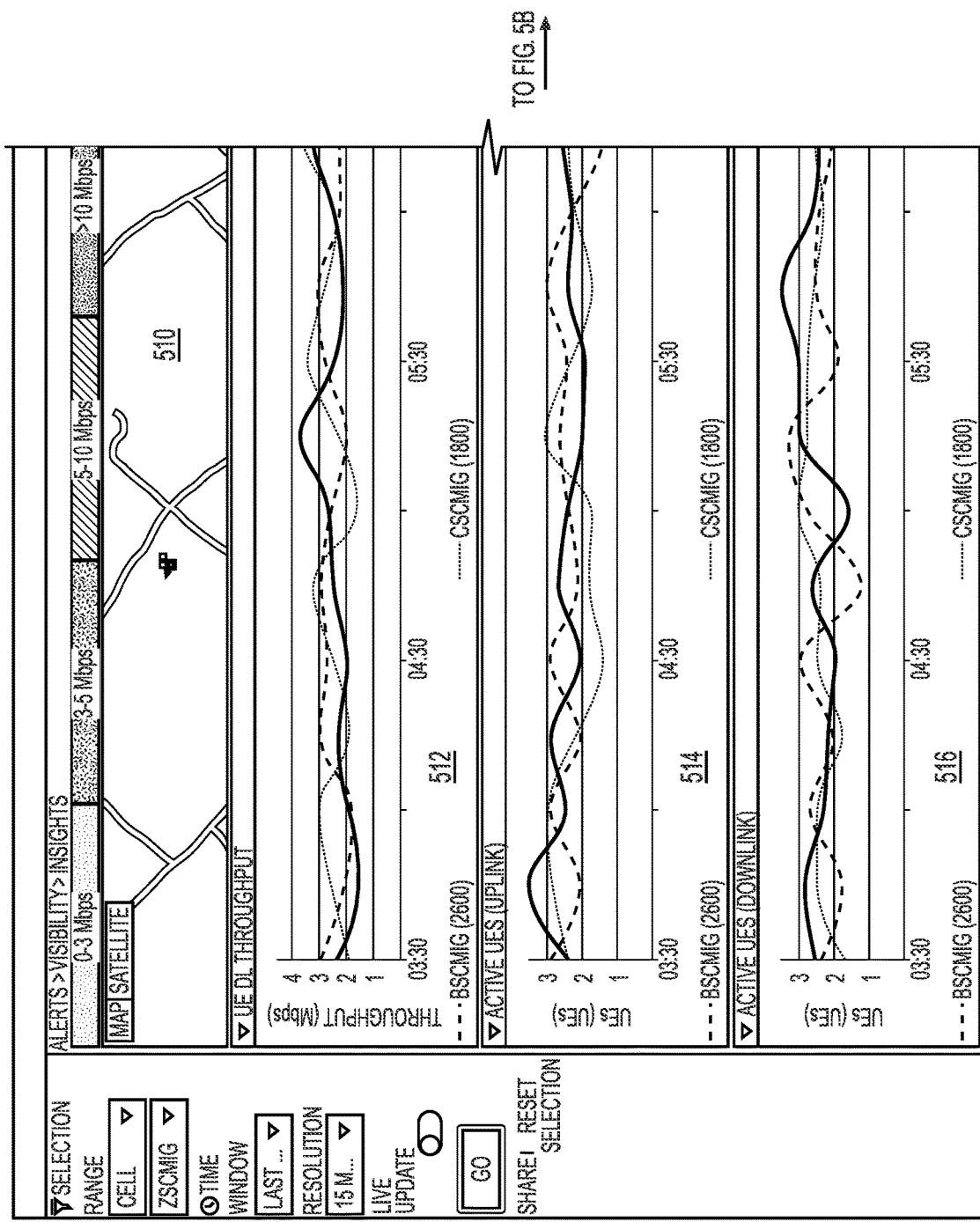
FIGS. 5A and 5B are illustrations of an example GUI screen for load imbalance detection and root cause identification.
Figure 5B:
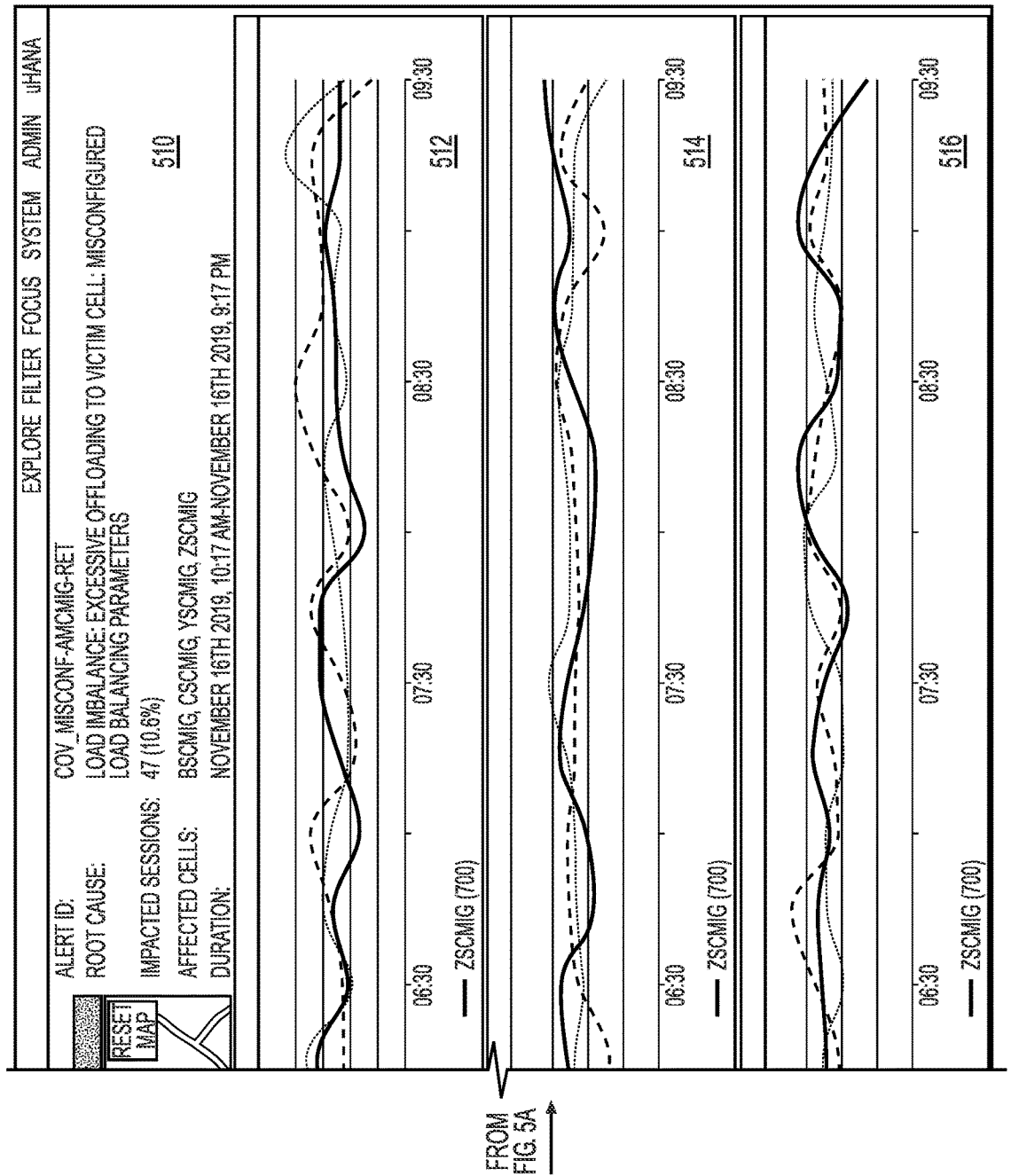

The user can select an alert in one example and see how various factors related to the alert changed during the time span over which the impacts were determined. For example, FIGS. 5A and 5B are illustrations of a second GUI screen 510 for load imbalance details. The second screen 510 can include panes 512, 514, 516 having relevant data regarding the sessions impacted by imbalance. A first pane 512 graphs throughput over the time period. A second pane 514 graphs active users (sessions) on an uplink over the period. A third pane 516 graphs active users (sessions) on a downlink over the period. FIG. 5B shows the second half of the second screen 510.

Figure 6A:
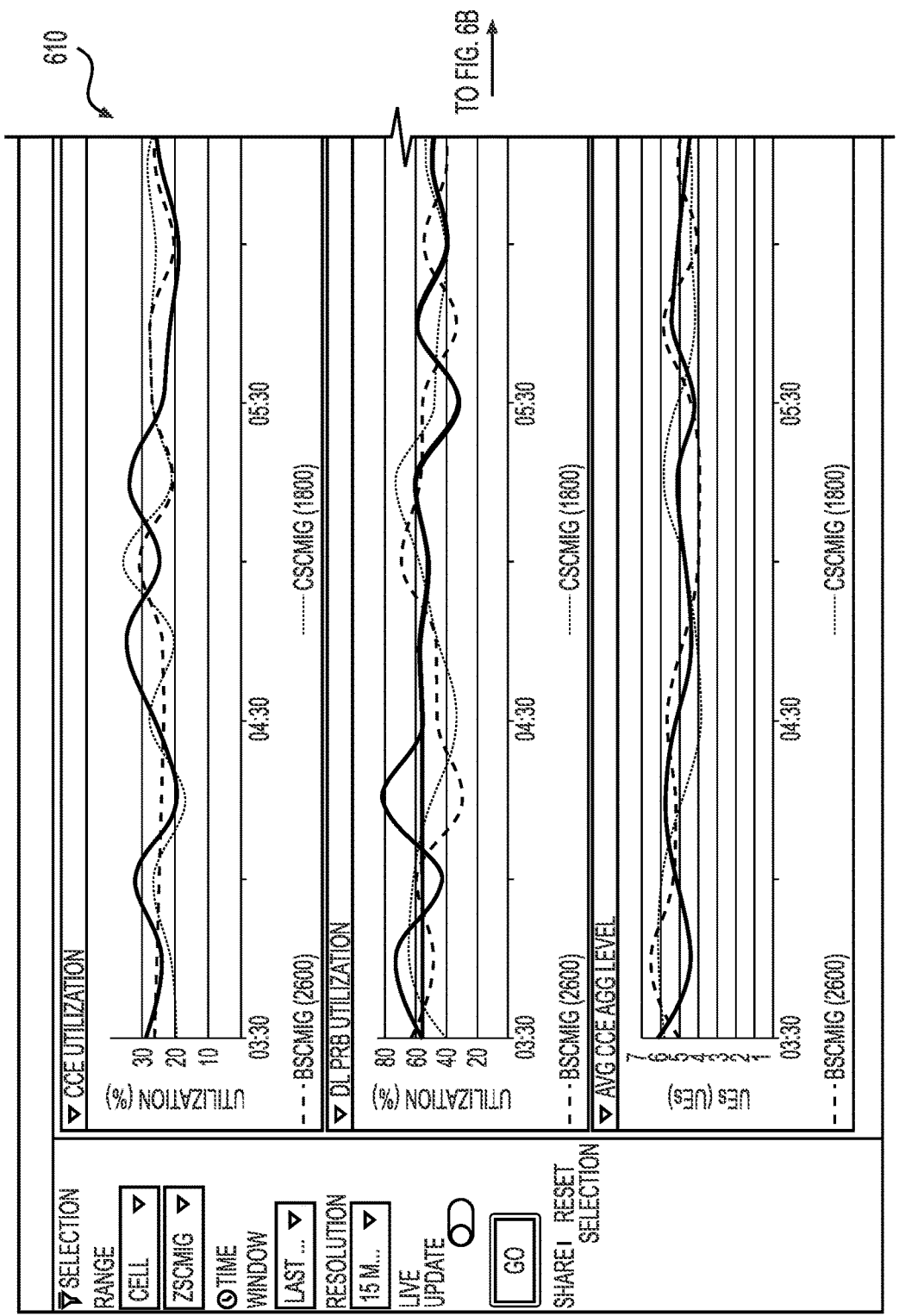
Figure 7A:
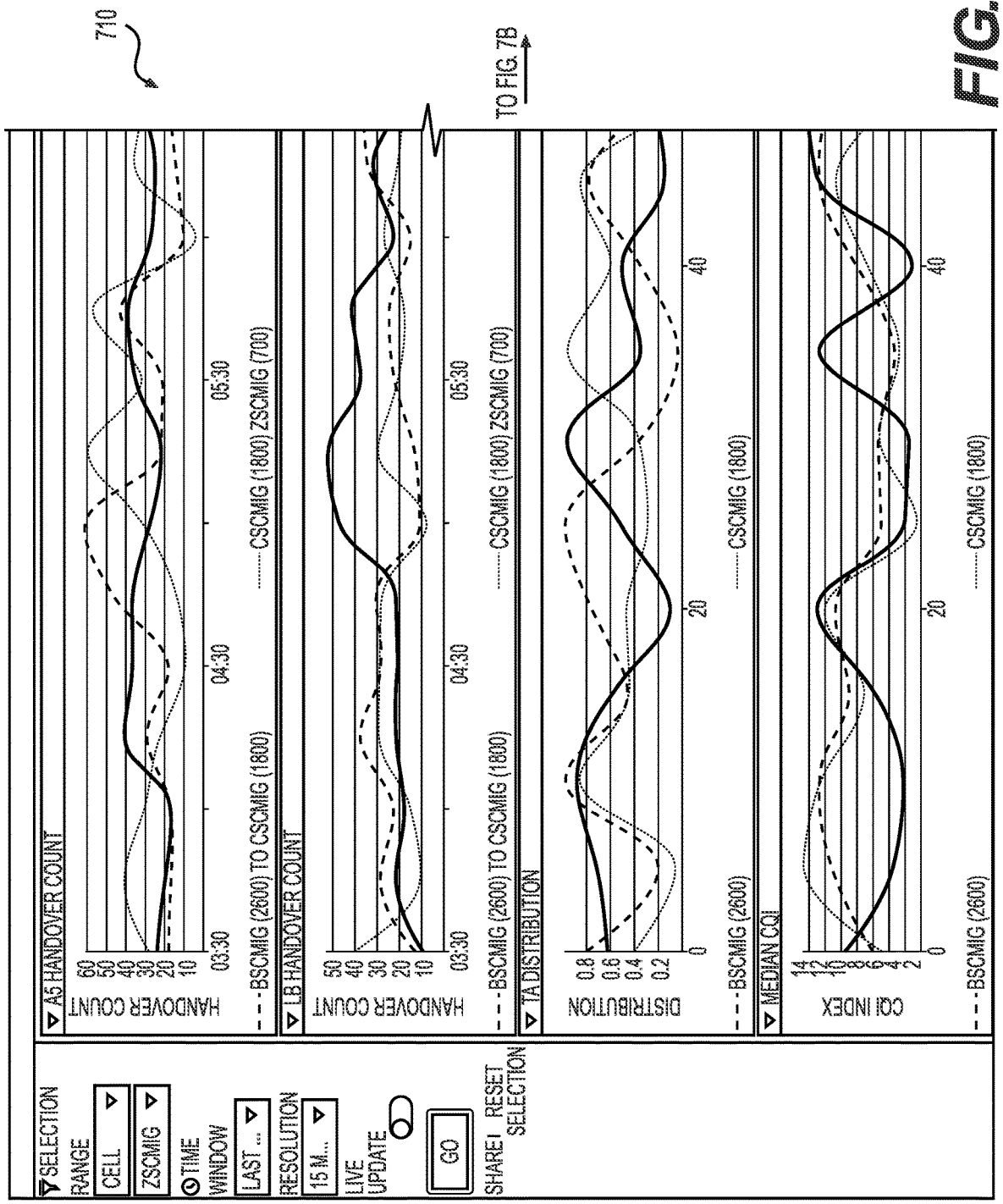
FIGS. 7A and 7B are illustrations of an example GUI screen for load imbalance detection and root cause identification.
Figure 7B:
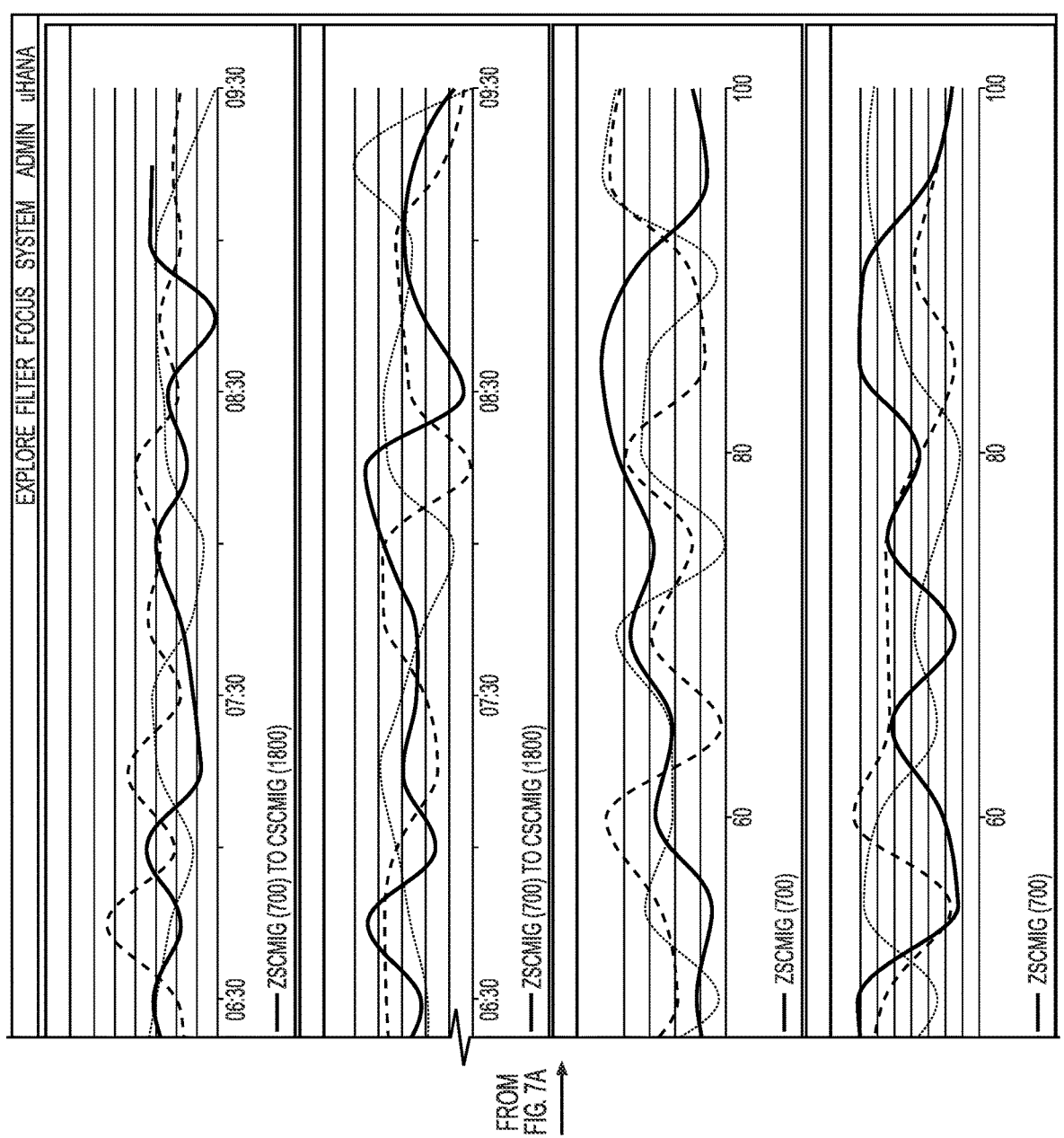

FIGS. 6A and 6B are illustrations of a third example GUI screen 610 showing utilization percentages of the victim cell over the time span during which the impacts were detected. FIGS. 7A and 7B are illustrations of a fourth example GUI screen 710 showing handover counts for the victim cell during the same time span. The counts can be separate for A5 LTE handovers versus load balancing handovers (due to load balancing parameters). The screen 710 can also show cell resource distribution during the sessions. A fourth pane for signal quality, represented as a composite quality index ("CQI") is also shown in this example. These detail screens can allow an administrator to drill down for anomalies related to the impacts.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for identifying load imbalances in a telco network, comprising:
receiving telemetry data;
determining an actual throughput for a first session at a first base station of a plurality of base stations;
predicting an expected throughput for the first session based on a normalized load at the first base station, wherein the normalized load relates to loads across the plurality of base stations;
determining that the expected throughput exceeds the actual throughput by at least a threshold amount; and
indicating, on a graphical user interface ("GUI"), a load imbalance exists with respect to the first base station.

2. The method of claim 1, wherein the normalized load is determined based on features corresponding to at least one of: a utilization level of a downlink control channel across the plurality of base stations, an average number of users waiting in a queue of any of the plurality of base stations, a fraction of resources available on average to a user, an average utilization of a data channel of the base station, and a number of physical resource blocks available, on average, at the plurality of base stations.

3. The method of claim 1, further comprising:
determining that a number outgoing of session handoffs from the base station exceeds a number of incoming session handoffs to the base station; and
indicating that improved load balancing for the base station can be achieved by at least one of offloading additional traffic from the base station and reconfiguring load balancing parameters for the base station.

4. The method of claim 1, further comprising:
determining that a number of incoming session handoffs to the base station exceeds a number of outgoing session handoffs from the base station; and
grouping the incoming session handoffs as triggered by a vendor or based on a Long Term Evolution (LTE) standard.

5. The method of claim 4, wherein, based on a majority of the incoming session handoffs being grouped as triggered by a vendor, indicating that the vendor's load balancing parameters is a root cause.

6. The method of claim 4, wherein, based on a majority of the incoming session handoffs being grouped as based on the LTE standard, indicating that a coverage footprint of the base station is a root cause.

7. The method of claim 1, wherein a same performance model is used to determine actual throughput and predict the expected throughput.

8. A non-transitory, computer-readable medium containing instructions that, when executed by a hardware-based processor, performs stages for identifying load imbalances in a telco network, the stages comprising:
receiving telemetry data;
determining an actual throughput for a first session at a first base station of a plurality of base stations;
predicting an expected throughput for the first session based on a normalized load at the first base station, wherein the normalized load relates to loads across the plurality of base stations;
determining that the expected throughput exceeds the actual throughput by at least a threshold amount; and
indicating, on a graphical user interface ("GUI"), a load imbalance exists with respect to the first base station.

9. The non-transitory, computer-readable medium of claim 8, wherein the normalized load is determined based on features correspond to at least one of: a utilization level of a downlink control channel across the plurality of base stations, an average number of users waiting in a queue of any of the plurality of base stations, a fraction of resources available on average to a user, an average utilization of a data channel of the base station, and a number of physical resource blocks available, on average, at the plurality of base stations.

10. The non-transitory, computer-readable medium of claim 8, the stages further comprising:
   determining that a number outgoing of session handoffs from the base station exceeds a number of incoming session handoffs to the base station; and
   indicating that improved load balancing for the base station can be achieved by at least one of offloading additional traffic from the base station, and reconfiguring load balancing parameters for the base station.

11. The non-transitory, computer-readable medium of claim 8, the stages further comprising:
   determining that a number of incoming session handoffs to the base station exceeds a number of outgoing session handoffs from the base station; and
   grouping the incoming session handoffs as triggered by a vendor or based on a Long Term Evolution (LTE) standard.

12. The non-transitory, computer-readable medium of claim 11, wherein, based on a majority of the incoming session handoffs are grouped as triggered by a vendor, indicating that the vendor's load balancing parameters is a root cause.

13. The non-transitory, computer-readable medium of claim 11, wherein, based on a majority of the incoming session handoffs are grouped as based on the LTE standard, indicating that a coverage footprint of the base station is a root cause.

14. The non-transitory, computer-readable medium of claim 8, wherein a same performance model is used to determine actual throughput and predict the expected throughput.

15. A system for identifying load imbalances in a telco network, comprising:
   a memory storage including a non-transitory, computer-readable medium comprising instructions; and
   a computing device including a hardware-based processor that executes the instructions to carry out stages comprising:
   receiving telemetry data;
   determining an actual throughput for a first session at a first base station of a plurality of base stations;
   predicting an expected throughput for the first session based on a normalized load at the first base station, wherein the normalized load relates to loads across the plurality of base stations;
   determining that the expected throughput exceeds the actual throughput by at least a threshold amount; and
   indicating, on a graphical user interface ("GUI"), a load imbalance exists with respect to the first base station.

16. The system of claim 15, wherein the normalized load is determined based on features correspond to at least one of: a utilization level of a downlink control channel across the plurality of base stations, an average number of users waiting in a queue of any of the plurality of base stations, a fraction of resources available on average to a user, an average utilization of a data channel of the base station, and a number of physical resource blocks available, on average, at the plurality of base stations.

17. The system of claim 15, the stages further comprising:
   determining that a number outgoing of session handoffs from the base station exceeds a number of incoming session handoffs to the base station; and
   indicating that improved load balancing for the base station can be achieved by at least one of offloading additional traffic from the base station, and reconfiguring load balancing parameters for the base station.

18. The system of claim 15, the stages further comprising:
   determining that a number of incoming session handoffs to the base station exceeds a number of outgoing session handoffs from the base station; and
   grouping the incoming session handoffs as triggered by a vendor or based on a Long Term Evolution (LTE) standard.

19. The system of claim 18, wherein, based on a majority of the incoming session handoffs are grouped as triggered by a vendor, indicating that the vendor's load balancing parameters is a root cause.

20. The system of claim 18, wherein, based on a majority of the incoming session handoffs are grouped as based on the LTE standard, indicating that a coverage footprint of the base station is a root cause.

* * * * *